(12) United States Patent
Williams et al.

(10) Patent No.: US 9,587,913 B2
(45) Date of Patent: Mar. 7, 2017

(54) INCISED COMPOSITE MATERIAL FOR SELECTIVE, MULTISPECTRAL REFLECTION

(71) Applicant: W. L. Gore & Associates, Inc., Newark, DE (US)

(72) Inventors: Neil R. Williams, Lincoln University, PA (US); Gregory D. Culler, Nottingham, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 14/157,217

(22) Filed: Jan. 16, 2014

(65) Prior Publication Data

US 2014/0205798 A1    Jul. 24, 2014

Related U.S. Application Data

(60) Provisional application No. 61/754,291, filed on Jan. 18, 2013.

(51) Int. Cl.
*B32B 3/24* (2006.01)
*F41H 3/02* (2006.01)
(Continued)

(52) U.S. Cl.
CPC ............... *F41H 3/02* (2013.01); *B32B 3/266* (2013.01); *B32B 5/024* (2013.01); *B32B 5/30* (2013.01);
(Continued)

(58) Field of Classification Search
CPC ......... F41H 3/02; B32B 3/266; B32B 27/322; B32B 5/32; H01Q 17/005
(Continued)

(56) References Cited

U.S. PATENT DOCUMENTS 3,069,796 A  * 12/1962  Benisch et al. ................. 428/17
3,733,606 A    5/1973  Johansson
(Continued)

FOREIGN PATENT DOCUMENTS

CA    2366240    9/2000
DE   20 16 404    1/1977
(Continued)

OTHER PUBLICATIONS

Yshield EMR-Protection, Y-Shield shielding Paints, Material Safety Data Sheet, www.yshield.com, Pocking Germany.

*Primary Examiner* — William P Watkins, III
(74) *Attorney, Agent, or Firm* — Carol A. Lewis White

(57) ABSTRACT

Geometrically incised fabrics that control reflectance and transmission in the visible, thermal, nIR, SWIR, and microwave/millimeter bands of the electromagnetic spectrum are provided. The incised fabrics include incised flaps that move about a hinged attachment portion into open and closed configurations. The incised flaps may be oriented in patterns containing overlapping, inverted incised flaps, overlapping inverted and non-inverted incised flaps, or in block patterns of incised flaps. Selective transmission of electromagnetic waves can be modulated by the geometry of the incised flaps and the amount of tension applied to the incised fabric. The incised fabric includes a composite material including an asymmetric ePTFE laminate, a metalized layer, an ePTFE membrane layer, and a textile. A second ePTFE asymmetric laminate and a metal layer may be attached to the composite material to form a reversible composite. Incised fabrics may be used to form selective, multispectral reflective covers and garments.

26 Claims, 14 Drawing Sheets

(51) Int. Cl.
  *B32B 27/32* (2006.01)
  *B32B 5/02* (2006.01)
  *B32B 5/30* (2006.01)
  *B32B 27/08* (2006.01)
  *B32B 27/12* (2006.01)
  *B32B 3/26* (2006.01)
  *H01Q 17/00* (2006.01)

(52) U.S. Cl.
  CPC .............. *B32B 27/08* (2013.01); *B32B 27/12* (2013.01); *B32B 27/322* (2013.01); *B32B 2255/04* (2013.01); *B32B 2255/10* (2013.01); *B32B 2255/205* (2013.01); *B32B 2262/0276* (2013.01); *B32B 2264/0257* (2013.01); *B32B 2307/4026* (2013.01); *B32B 2307/54* (2013.01); *B32B 2437/00* (2013.01); *B32B 2459/00* (2013.01); *H01Q 17/005* (2013.01); *Y10T 428/24331* (2015.01); *Y10T 442/3333* (2015.04)

(58) Field of Classification Search
  USPC .............................. 428/136, 132, 195.1, 919
  See application file for complete search history.

(56) References Cited

U.S. PATENT DOCUMENTS

| | | | |
|---|---|---|---|
| 3,953,566 A | 4/1976 | Gore | |
| 4,095,940 A | 6/1978 | Weingarten | |
| 4,142,015 A | 2/1979 | Bienz | |
| 4,308,882 A | 1/1982 | Pusch et al. | |
| 4,323,605 A | 4/1982 | Rush | |
| 4,467,005 A | 8/1984 | Pusch et al. | |
| 4,479,994 A | 10/1984 | Berg | |
| 4,493,863 A * | 1/1985 | Karlsson | 428/17 |
| 4,495,239 A | 1/1985 | Pusch et al. | |
| 4,529,633 A | 7/1985 | Karlsson | |
| 4,539,256 A | 9/1985 | Shipman | |
| 4,560,595 A | 12/1985 | Johansson | |
| 4,606,848 A | 8/1986 | Bond | |
| 4,606,966 A | 8/1986 | Karlsson | |
| 4,615,921 A | 10/1986 | Johansson | |
| 4,621,012 A | 11/1986 | Pusch | |
| 4,645,704 A | 2/1987 | Hellwig | |
| 4,726,989 A | 2/1988 | Mrozinski | |
| 4,862,730 A | 9/1989 | Crosby | |
| 4,863,792 A | 9/1989 | Mrozinski | |
| 4,953,922 A | 9/1990 | Graqvist | |
| 5,077,101 A | 12/1991 | Conway et al. | |
| 5,185,381 A | 2/1993 | Ruffoni | |
| 5,281,460 A | 1/1994 | Cox | |
| 5,312,678 A | 5/1994 | McCullough, Jr. et al. | |
| 5,523,757 A | 6/1996 | Resnick | |
| 5,571,621 A | 11/1996 | Stevens et al. | |
| 5,750,242 A | 5/1998 | Culler | |
| 5,922,986 A | 7/1999 | Wanninger | |
| 5,955,175 A | 9/1999 | Culler | |
| 5,976,643 A | 11/1999 | Sallee | |
| 6,224,982 B1 | 5/2001 | Woldanski | |
| 6,288,837 B1 | 9/2001 | Hubbard | |
| 6,374,413 B1 | 4/2002 | Magee | |
| 6,780,515 B2 | 8/2004 | Dobler | |
| 6,800,573 B2 | 10/2004 | Van De Ven et al. | |
| 6,997,981 B1 | 2/2006 | Coombs et al. | |
| 7,118,801 B2 | 10/2006 | Ristic-Lehmann et al. | |
| 7,344,661 B2 | 3/2008 | Kuehl | |
| 8,013,776 B2 | 9/2011 | Child | |
| 8,524,621 B2 | 9/2013 | Liggett et al. | |
| 2004/0187186 A1 * | 9/2004 | Boezi | 2/84 |
| 2004/0250331 A1 | 12/2004 | Bayer | |
| 2005/0144697 A1 | 7/2005 | Casey | |
| 2006/0222827 A1 | 10/2006 | Marshall et al. | |
| 2007/0009679 A1 | 1/2007 | Holcombe et al. | |
| 2007/0072501 A1 | 3/2007 | Holcombe et al. | |
| 2007/0161310 A1 | 7/2007 | Shope | |
| 2009/0214852 A1 * | 8/2009 | Kelsey et al. | 428/315.9 |
| 2009/0263644 A1 | 10/2009 | Kelsey et al. | |
| 2009/0300824 A1 * | 12/2009 | Yeung | 2/265 |
| 2010/0028624 A1 | 2/2010 | Smith et al. | |
| 2011/0271416 A1 * | 11/2011 | Sturgill et al. | 2/69 |

FOREIGN PATENT DOCUMENTS

| | | |
|---|---|---|
| EP | 0490467 | 6/1992 |
| FR | 2 370 821 | 6/1978 |
| GB | 1314624 | 4/1973 |
| GB | 2 237 862 | 10/1990 |
| GB | 2 281 748 | 3/1995 |
| KR | 10-2008-0021035 | 3/2008 |
| KR | 10-2011-0069011 | 6/2011 |
| WO | WO2009/017520 | 2/2009 |

* cited by examiner

INCISED COMPOSITE MATERIAL FOR SELECTIVE, MULTISPECTRAL REFLECTION

FIELD OF THE INVENTION

The present invention relates generally to camouflage materials, and more specifically, to geometrically incised fabrics that control reflectance and transmission in the visible, thermal, nIR, SWIR, and microwave/millimeter (RF) bands of the electromagnetic spectrum.

BACKGROUND OF THE INVENTION

Camouflage materials used by hunters and by the military typically provide camouflage properties in the visible portion of the electromagnetic (EM) spectrum. Recent improvements to military camouflage have extended performance into the nIR portion and the short wave infrared (SWIR). Due to the increased use of thermal imaging sensors operating in the mid wave infrared (MWIR) and long wave infrared (LWIR) EM bands, military users have sought enhanced protection in these sensor bands.

Conventional means for achieving camouflage performance in the thermal bands often creates higher reflectance in the visible and nIR bands of the EM spectrum. Likewise, performance in the visible and nIR bands often increases detection in the thermal bands. Thus, an effective multispectral (visible, nIR, SWIR, MWIR, LWIR, RF) solution has not been available to control reflectance, transmission and absorption properties in a single construct throughout these distinct bands of the EM spectrum.

SUMMARY OF THE INVENTION

It is an object of the invention to provide a composite material that may be used to form incised panels. The composite material includes an asymmetrical expanded polytetrafluoroethylene (ePTFE) laminate, a metalized layer, an ePTFE membrane layer, and a textile layer. The asymmetric ePTFE laminate contains one ePTFE membrane that has a first microstructure and a second ePTFE membrane that has a second microstructure. Optionally, the ePTFE laminate contains a third ePTFE membrane with a third microstructure. In exemplary embodiments, the first and third microstructures are "open" and the second microstructure is "tight". An open microstructure may be defined by having pore sizes that are larger than the pore sizes in a tight microstructure. The first ePTFE membrane forms an outer layer of the composite material. The metalized layer may be a metal deposited on the second ePTFE membrane. Alternatively, the metalized layer may be a metalized substrate or a distinct metal layer adhered to the second ePTFE membrane. The textile is air permeable and may be selected from a woven, knit, or non-woven material. Additionally, the first ePTFE membrane may have thereon a coating composition that contains at least one colorant. The colorant may be selected to achieve a desired level of reflectance in the visible region and/or the nIR region of the electromagnetic spectrum. The composite material may also include a second ePTFE laminate containing a fourth ePTFE membrane with an open microstructure and a fifth ePTFE membrane with a tight microstructure. The fourth ePTFE membrane also forms an outer layer of the composite material, and may have thereon a coating composition containing at least one colorant. A composite material having colorized external ePTFE membrane layers is reversible. One side of the reversible composite material may depict a woodland pattern and the opposing side may depict a desert pattern.

It is another object of the present invention to provide an incised panel that includes (1) a composite material and (2) a plurality of incised flaps having a geometric configuration. Each incised flap contains a hinged flap portion. Upon the application of tension, at least a portion of the hinged flap portions assumes an open configuration. In an open configuration, the hinged flap portions assume a non-linear, three dimensional configuration with respect to the composite membrane. The degree of "openness" of the hinged flap portions, the angle at which the hinged flap portions open, and the number of hinged flap portions that open with the application of tension may be tailored to achieve a desired reflectance. Spectral band responses can be designed and spatial responses deflected, and in some cases, diffusive transmission may be obtained, with an incised panel containing incised flaps positioned in a random or a patterned orientation. Depending on the amount of tension applied, the incised flaps may open to reveal the back side of the hinged flap portion. In at least one embodiment, the back side of the hinged flap portion contains a different emissivity than the front side. The incised flaps may be oriented in an overlapping, inverted fashion to form a fundamental hinge system. Additionally, the incised flaps may form a fundamental flap cell that contains one inverted incised flap and two non-inverted incised flaps (with respect to the inverted incised flap). Also, the incised flaps may form a block pattern containing two or more rows where each row includes one inverted incised flap and two non-inverted incised flaps. Further, the incised flaps may form a hexagonal block having repeating pattern.

It is a further object of the present invention to provide a cover that includes (1) a base material and (2) at least one incised panel affixed to the base material. The incised panel includes a plurality of incised flaps that assume a non-linear, three dimensional open configuration upon the application of tension. Tension may be applied to the cover in any direction. The base material may be, for example, a mesh material, a woven textile, a non-woven textile, or textile laminate. A seam allowance may be incorporated into the incised panel so that there is a non-incised edge to permit the incised panel and the base material to be joined together. The incised panel may be sized smaller than the base material. By undersizing the incised panel, tension generated as the cover is pitched causes the incised flaps to open with a desired number of openings without further intervention from the operator. In addition, the cover may have any geometric shape. In one embodiment, the base material and the incised panel are substantially square or rectangular in shape. In one embodiment, the base material and the incised panel are stitched or otherwise attached around all four edges. In an alternative embodiment, the base material and the incised panel are joined at three edges so that the cover can be reversed. The incised panel may include a composite material described herein.

It is yet another embodiment of the invention to provide a garment that includes a plurality of incised panels appropriately sized and shaped so that the shaped pieces of incised panel may be affixed to each other to form the desired garment. In one embodiment, the shaped incised panel pieces are sewn to an underlying dry suit. The seams may be rendered waterproof by applying a waterproof sealant or waterproof tape to the seams. The incised flaps assume a non-linear, three dimensional configuration upon the application of tension. Additionally, the incised panel may include a composite material described herein.

BRIEF DESCRIPTIONS OF FIGURES

The advantages of this invention will be apparent upon consideration of the following detailed disclosure of the invention, especially when taken in conjunction with the accompanying drawings wherein.

DETAILED DESCRIPTION OF THE INVENTION

Figure 1:
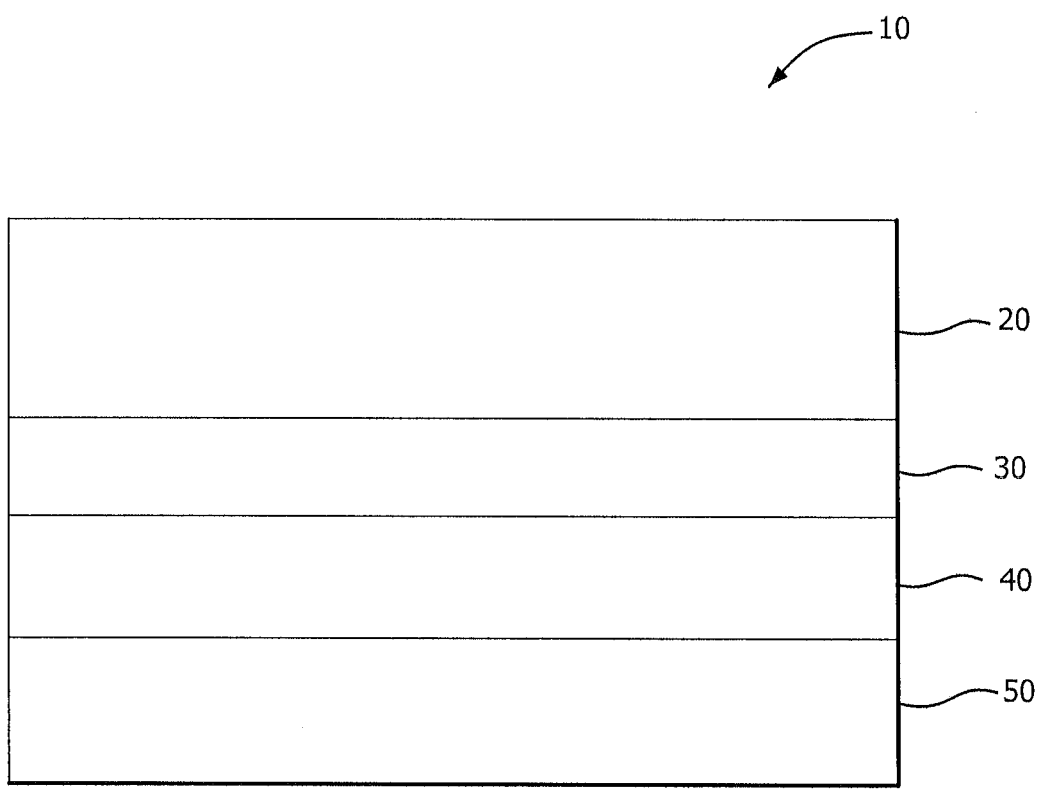
FIG. 1 is a schematic illustration of a composite material utilized to form incised panels according to at least one exemplary embodiment of the present invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein.

In the drawings, the thickness of the lines, layers, and regions may be exaggerated for clarity. It will be understood that when an element such as a layer, region, substrate, or panel is referred to as being "on" another element, it can be directly on the other element or intervening elements may also be present. Also, when an element is referred to as being "adjacent" to another element, the element may be directly adjacent to the other element or intervening elements may be present.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements. In the drawings, the thickness of the lines, layers, and regions may be exaggerated for clarity.

It is to be appreciated that reference is made herein with respect to expanded polytetrafluoroethylene (ePTFE) for ease of description. However, it is to be understood that any suitable expanded fluoropolymer membrane may be used interchangeably with ePTFE within this application. Non-limiting examples of expandable fluoropolymers include, but are not limited to, expanded PTFE, expanded modified PTFE, expanded copolymers of PTFE, fluorinated ethylene propylene (FEP), and perfluoroalkoxy copolymer resin (PFA). Patents have been filed on expandable blends of PTFE, expandable modified PTFE, and expanded copolymers of PTFE, such as, but not limited to, U.S. Pat. No. 5,708,044 to Branca; U.S. Pat. No. 6,541,589 to Baillie; U.S. Pat. No. 7,531,611 to Sabol et al.; U.S. patent application Ser. No. 11/906,877 to Ford; and U.S. patent application Ser. No. 12/410,050 to Xu et al. Porous membranes including polymeric materials such as polyolefins (e.g., polypropylene and polyethylene), polyurethanes, and polyesters are considered to be within the purview of the invention provided that the polymeric material can be processed to form porous or microporous membrane structures.

Reference is made to FIG. 1, which illustrates a composite material 10 utilized to form incised panels according to the present invention. The composite material 10 is formed of an asymmetric expanded polytetrafluoroethylene (ePTFE) laminate 20 where an inner side of the laminate has thereon a metalized layer 30. As used herein, "asymmetric" is meant to indicate that the laminate structure includes multiple layers of ePTFE where at least one ePTFE layer has a microstructure that is different from the microstructure of a second ePTFE layer. In one embodiment, an asymmetric porous laminate 20 includes multiple regions through the thickness of the structure in the form of layers of ePTFE membranes. For example, a multilayer ePTFE asymmetric laminate 20 may include multiple regions through the thickness of the structure where at least two of the ePTFE membrane layers have different microstructures. In some embodiments where the asymmetric laminate 20 has at least three ePTFE membrane layers, two of the ePTFE membrane layers may have the same microstructure, provided at least one ePTFE membrane layer has a different microstructure. In all instances, the expanded ePTFE laminate 20 has an "inner" layer of an ePTFE membrane and an "outer" layer of an ePTFE membrane. The "outer" layer of ePTFE membrane generally forms the exterior surface of the final product. It is to be understood that the phrases "ePTFE layer" and "ePTFE membrane layer" may be used interchangeably herein. The composite material 10 may be opaque and highly reflective. The phrases "ePTFE layer" and "ePTFE membrane layer" may be used interchangeably herein.

Figure 14:
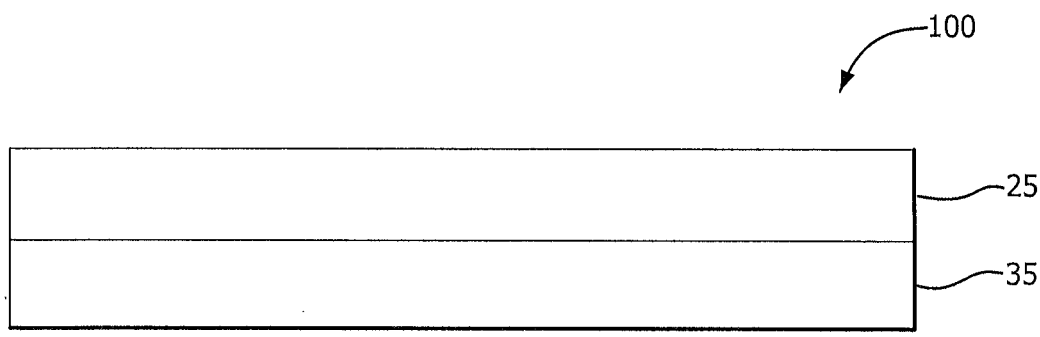
FIG. 14 is a schematic illustration of a two-layer asymmetric ePTFE membrane according to one exemplary embodiment of the invention.

Reference is now made to FIG. 14, which illustrates a two-layer asymmetric laminate 100. The two-layer asymmetric laminate 100 contains a first ePTFE membrane layer 25 having a first microstructure and a second ePTFE membrane layer 35 having a second microstructure. The microstructure of ePTFE is characterized by nodes interconnected by fibrils. The difference between the first microstructure of the first ePTFE membrane layer 25 and the second microstructure of the second ePTFE membrane layer 35 may be caused by, for example, a difference in pore size, a difference in node and/or fibril geometry or size and/or a difference in density. For instance, a larger average fibril length indicates a more "open" microstructure (i.e., larger pore size) and a lower bubble point. Conversely, a shorter fibril length indicates a more "tight" microstructure (i.e., a smaller pore size) and a higher bubble point. Notwithstanding the mechanism utilized to achieve different microstructures within the asymmetric laminate 100, the first ePTFE membrane layer 25 possesses a microstructure that is more "open" than the second microstructure of the second ePTFE membrane layer 35. In the embodiment depicted in FIG. 14, the first ePTFE membrane layer 25 is considered to have an "open" microstructure and the second ePTFE membrane layer 35 is considered herein to have a "tight" microstructure. The first ePTFE membrane layer 25 forms the outer surface of the final product. As used herein, the term "open" as opposed to "tight" means that the pore size of the "open" microstructure is larger than that of the "tight" microstructure as evidenced by bubble point or any suitable means for characterizing pore size.

Figure 15:
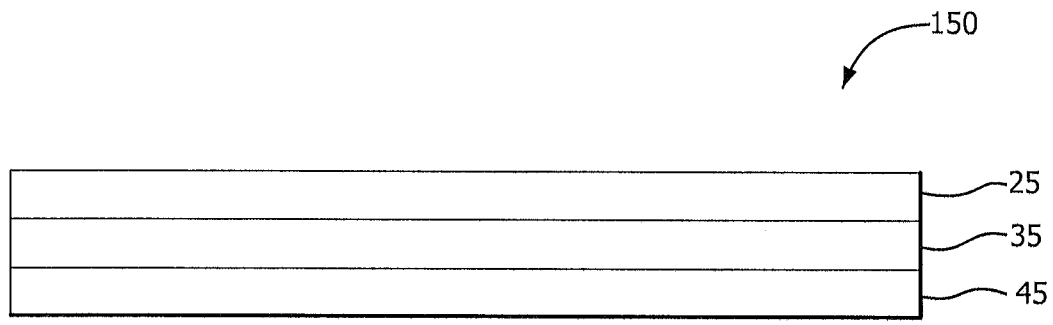
FIG. 15 is schematic illustration of a three-layer asymmetric ePTFE membrane according to another exemplary embodiment of the invention.

In another exemplary embodiment, the asymmetric ePTFE laminate has at least three ePTFE membrane layers where two of the ePTFE membrane layers may have the same "open" microstructure provided at least one ePTFE membrane layer has a different, "tight" microstructure. Such a three layer asymmetric ePTFE laminate is depicted generally in FIG. 15. The three-layer asymmetric ePTFE laminate 150 contains a first ePTFE membrane layer 25 that has an "open" microstructure and a second ePTFE membrane layer 35 that has a less open, or "tight", microstructure as described above with reference to FIGS. 1 and 14. A third ePTFE membrane layer 45 is provided on the second ePTFE membrane layer 35 on the side opposing the first ePTFE membrane layer 25 such that the second ePTFE membrane layer 35 is centrally located within the ePTFE laminate 150. The third ePTFE membrane layer 45 may have a microstructure that is substantially the same as, or even identical to, the first ePTFE membrane layer 25. Alternatively, the third ePTFE membrane layer 45 may have a microstructure that is different from either the first ePTFE membrane layer 25 or the second ePTFE membrane layer 35 provided that the microstructure of the third ePTFE membrane layer 45 is more "open" than the second ePTFE membrane layer 35.

Turning back to FIG. 1, the metalized layer 30 may be a metal deposited on the inner ePTFE membrane layer of the asymmetric ePTFE laminate 20 by any suitable conventional deposition method. The metal may be, but is not limited to, Ag, Cu, Au, Ni, Sn, Al, and Cr, Alternatively, the metalized layer 30 may be a separate, distinct metal layer, such as, for example, an aluminum layer, that is adhered to the inner ePTFE membrane layer of the asymmetric ePTFE laminate 20. The metalized layer 30 may alternatively be a metalized substrate, such as, but not limited to, a metalized woven substrate, a metalized non-woven substrate, and the like. The metalized layer 30 is adhered to an ePTFE membrane layer 40. In exemplary embodiments, the ePTFE membrane layer 40 has a tight microstructure.

Figure 16A:
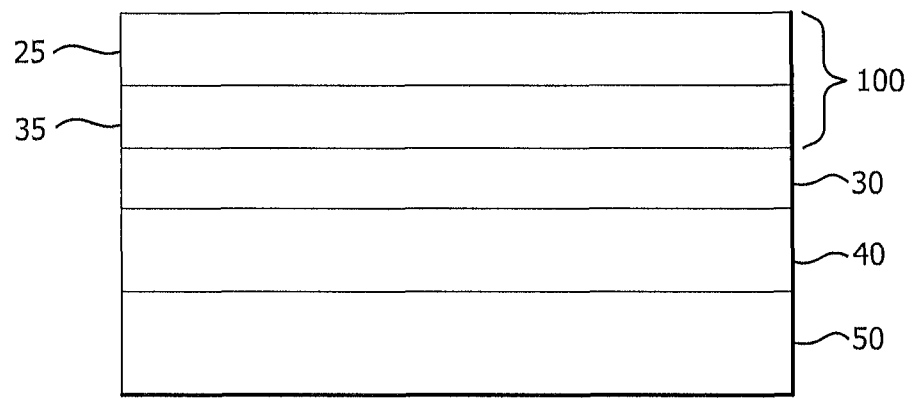
FIG. 16A is a schematic illustration of a two-layer asymmetric ePTFE membrane having thereon a textile according to an exemplary embodiment of the invention.
Figure 16B:
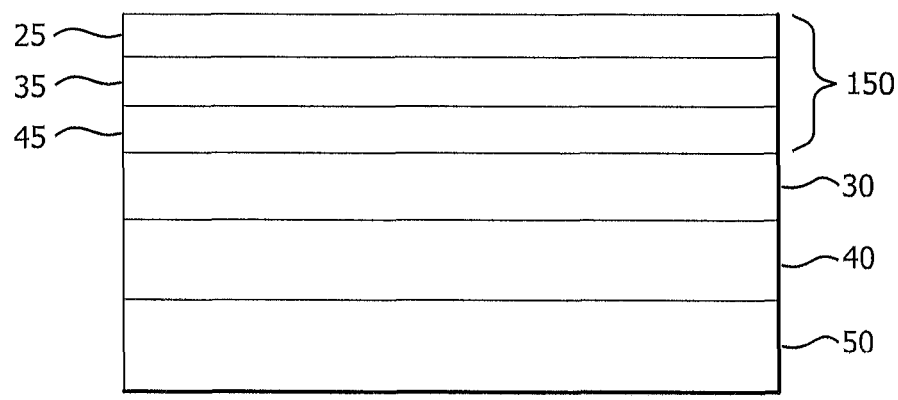
FIG. 16B is a schematic illustration of a three-layer asymmetric ePTFE membrane having thereon a textile according to an exemplary embodiment of the invention.

Additionally, a textile layer 50 is attached to the ePTFE membrane layer 40. The textile 50 is air permeable and may comprise a woven, knit, or non-woven material, and it may include materials such as, but not limited to cotton, rayon, nylon, polyester, and blends thereof. The weight of the textile forming the textile layer 50 is not particularly limited except as required by the application. Schematic illustrations depicting a composite material containing a two-layer asymmetric ePTFE laminate 100 and a composite material containing a three-layer asymmetric ePTFE laminate 150 are depicted in FIGS. 16A and 16B, respectively.

Any suitable process for joining the asymmetric ePTFE membrane layer 20, metalized layer 30, ePTFE membrane layer 40, and textile layer 50 may be used, such as gravure lamination, fusion bonding, spray adhesive bonding, and the like. An adhesive may be applied discontinuously or continuously, provided that breathability through the composite material is maintained. For example, the adhesive may be applied in the form of discontinuous attachments, such as by discrete dots, or in the form of an adhesive web to adhere layers of the composite material together.

The outer ePTFE membrane layers of the asymmetric ePTFE laminates 20,100,150 have microstructures where the pores of the porous film are sufficiently tight so as to provide liquid proofness and sufficiently open to provide properties such as moisture vapor transmission and penetration by coatings, such as coatings of colorants and oleophobic compositions. The phrase "outer layer" as used herein is meant to describe the layer that is exposed outwardly, i.e. to the environment. For example, in the composites depicted in FIGS. 16A and 16B, ePTFE membrane layer represented by reference numeral 25 is the outer ePTFE membrane layer. The outer ePTFE membrane layer has a surface that, when printed, provides a durable aesthetic. Aesthetic durability can be achieved in some embodiments with colorant coating compositions that comprise a pigment having a particle size sufficiently small to fit within the pores of the porous substrate. Pigment particles having a mean diameter of less than about 250 nm are useful for forming durable color. Coating compositions may further comprise a binder capable of wetting the porous substrate and binding the pigment to the pore walls.

Coating compositions comprising colorants can be applied to provide a variety of colors and designs, such as solid, camouflage, and print patterns. Coating compositions may comprise one or more colorants suitable for use in printing camouflage patterns such as woodland and desert patterns. In one exemplary embodiment, a coating composition suitable for use in printing a woodlands camouflage pattern on to a surface of a porous film includes black, brown, green, and light green colorant. In another exemplary embodiment, a coating composition includes brown, khaki, and a tan colorant suitable for printing a desert camouflage pattern. Other embodiments comprise compositions comprising colorants having shade variations within these two examples.

The colorant may be used to affect the visible, nIR, and SWIR spectral response. In addition, the colorant may include one or more additives that absorb, refract, and/or reflect light. Additionally, the colorant may include one or more dyes including, but not limited to acid dyes, disperse dyes, mordant dyes, and solvent dyes. The colorant may also comprise one or more pigments including, but not limited to carbon pigments, cadmium pigments, iron oxide pigments, zinc pigments, arsenic pigments, and organic pigments. The colorant may be applied as an ink, toner, or other appropriate print media to deliver the dye or pigment onto or into the polymeric substrate. Ink suitable for use in the present invention may be solid, aqueous, or solvent based.

In some embodiments, the colorant is selected to achieve a particular nIR reflectance in addition to the desired visible reflectance of the composite material. For example, reflecting and absorbing additives may be selected as a colorant and applied to the asymmetric ePTFE laminate in a manner to achieve a desired level of both the color (visible) and nIR reflectance. nIR additives such as but not limited to carbon, metal, and $TiO_2$ can be added to the to asymmetric ePTFE laminate to achieve specific nIR, SWIR, MWIR, or LWIR reflectance-properties. Specific reflectance properties of the construct in the short wave infrared (SWIR) can also be obtained through the use of infrared (IR) additives, adjusting the pore size of the polymeric material, and/or adjusting the thickness of the polymeric material.

The coating composition can be applied to the outer ePTFE layer of the asymmetric ePTFE laminate by conventional printing methods. Application methods for colorizing include but are not limited to transfer coating, screen printing, gravure printing, ink-jet printing, and knife coating. Additional topical treatments can be applied to the porous membrane, provided sufficient porosity throughout the composite material 10 is maintained to remain moisture vapor transmissivity.

Figure 2:
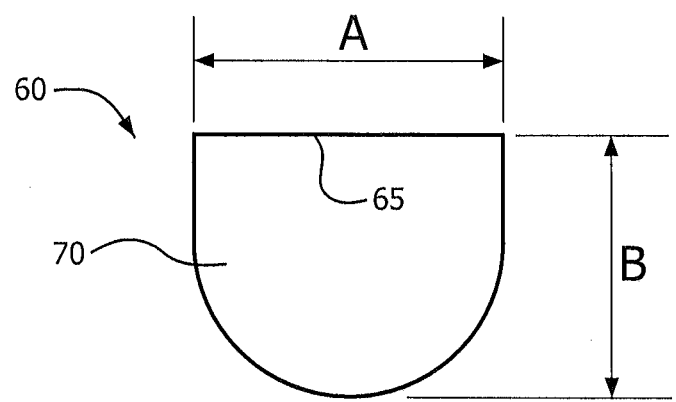
FIG. 2 is a schematic illustration of an incised flap where the height of the hinged flap portion is substantially the same as the height of the incised flap according to one exemplary embodiment of the invention.

The composite material may be incised to form incised panels, which, in turn can be used to form protective covers or garments, as described in more detail below. An exemplary incised flap 60 which may be cut into the composite material is depicted in FIG. 2. The incised flap 60 may have a generally semi-circular shape with an incised width depicted as "A" and an incised height depicted as "B". The flap 60 is and is hingedly attached at attachment portion 65. It is to be noted that exemplary ranges for the designations "A" through "K", and B' utilized in FIGS. 2-6 are set forth in Table 1. The incised flap 60 can have virtually any geometric shape, such as, but not limited to, square, rectangular, round, oval, or triangular. In addition, the incision forming the incised flap 60 may be smooth, such as is depicted in FIG. 2. In other embodiments, the incision is a non-smooth cut, such as, for example, to provide a "wavy" or "pointed" incision (not illustrated). The width "A" and the height "B" may range in size from about 0.5 mm to about 8 cm, from about 0.38 mm to about 6 cm, or from about 0.25 mm to about 4 cm. As shown in FIG. 2, the incised height "B" may be the same or substantially the same as the hinged flap portion 70. The hinged flap portion 70 is able to move about the attachment portion 65 into open and closed configurations. A closed configuration of the incised flap 60 is depicted in FIG. 2.

Figure 3:
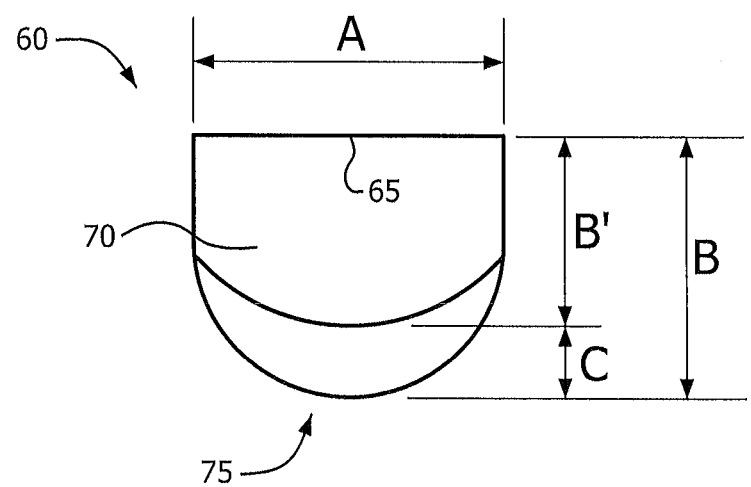
FIG. 3 is a schematic illustration of an incised flap where the height of the hinged flap portion is less than the height of the incised flap according to another exemplary embodiment of the invention.

In another embodiment depicted generally in FIG. 3, the incised flap 60 is cut such that height B' of the flap portion 70 is less than the height "B" of the incised portion by a distance "C", which is the height B minus the height B'. The void thus formed allows a degree of transmission through the incised panel while still allowing the incised flaps 60 to scatter energy. Such an incised flap 60 containing a void 75 has a width depicted as "A" and a height depicted as "B". The flap portion 70 has a height depicted as "B". The width "A" may range in size from about 0.5 mm to about 8 cm, from about 0.38 mm to about 6 cm, or from about 0.25 mm to about 4 cm. The height "B" may range in size from about 0.5 mm to about 8 cm, from about 0.38 mm to about 6 cm, or from about 0.25 mm to about 4 cm. The height "B" of the flap portion may range in size from about 0 mm to about 8 cm (up to about 8 cm), from about 0 mm to about 6 cm (up to about 6 cm), or from about 0 mm to about 4 cm (up to about 4 cm).

Figure 4:
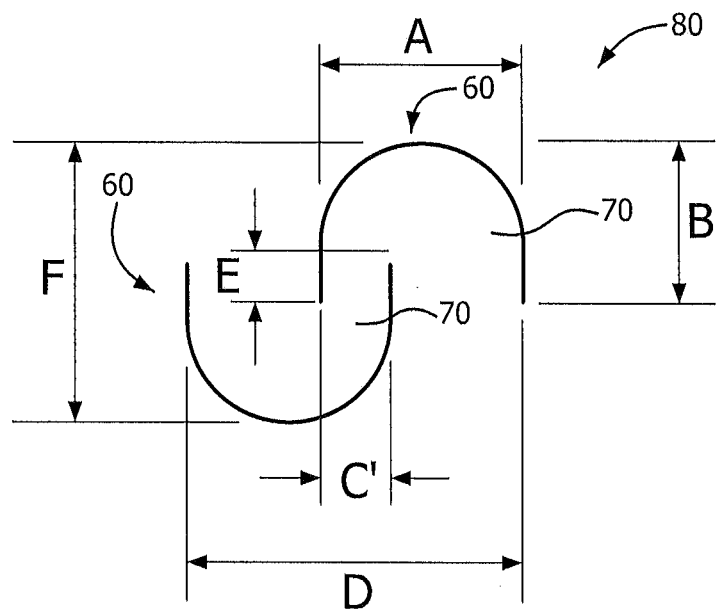
FIG. 4 is a schematic illustration of a fundamental hinge system containing an overlapping, inverted incised flap according to an exemplary embodiment of the invention.

Incised flaps 60 may be oriented in an overlapping, inverted fashion as depicted in FIG. 4 to form a fundamental hinge system 80. Looking at FIG. 4, each hinged flap portion 70 has a width "A" and a height "B". The width "A" and the height "B" may range in size from about 0.5 mm to about 8 cm, from about 0.38 mm to about 6 cm, or from about 0.25 mm to about 4 cm. The hinged flap portions 70 depicted in FIG. 4 overlap each other by a height "E" and a width "C". The width "C" may range in size from about 0.1 mm to about 4 cm, from about 0.08 mm to about 3 cm, or from about 0.05 mm to about 2 cm. The height "E" may range in size from about 0 mm to about 8 cm (up to about 8 cm), from about 0 mm to about 6 cm (up to about 6 cm), or from about 0 mm to about 4 cm (up to about 4 cm). It is to be noted that a height "E" of zero represents no overlap of the incised flaps. The overall height of the hinged system 80 is represented by "F", and may range from about 1 mm to about 16 cm, from about 0.75 mm to about 12 cm, or from about 0.5 mm to about 8 cm. The overall width of the hinged system is represented by "D", and may range from about 1 mm to about 16 cm, from about 0.75 mm to about 12 cm, or from about 0.5 mm to about 8 cm.

Figure 5:
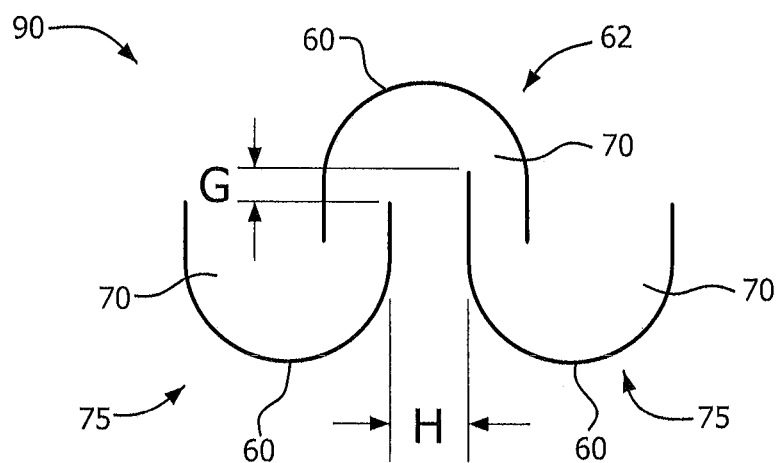
FIG. 5 is a schematic illustration of a fundamental flap cell containing an inverted, incised flap overlapping two non-inverted incised flaps according to one exemplary embodiment of the invention.

Turning to FIG. 5, a fundamental flap cell 90 containing one inverted incised flap 62 and two non-inverted incised flaps 75 can best be seen. The incised flaps 60 overlap each other by a distance "G", which may be from 0 mm to about 8 cm (up to about 8 cm), from about 0 mm to about 6 cm (up to about 6 cm), or from about 0 mm to about 4 cm (up to about 4 cm). Additionally, the non-inverted incised flaps 75 are separated by a distance "H". Distance "H" may be from about 0.1 mm to about 4 cm, from about 0.08 mm to about 3 cm, or from about 0.05 mm to about 2 cm.

Figure 6:
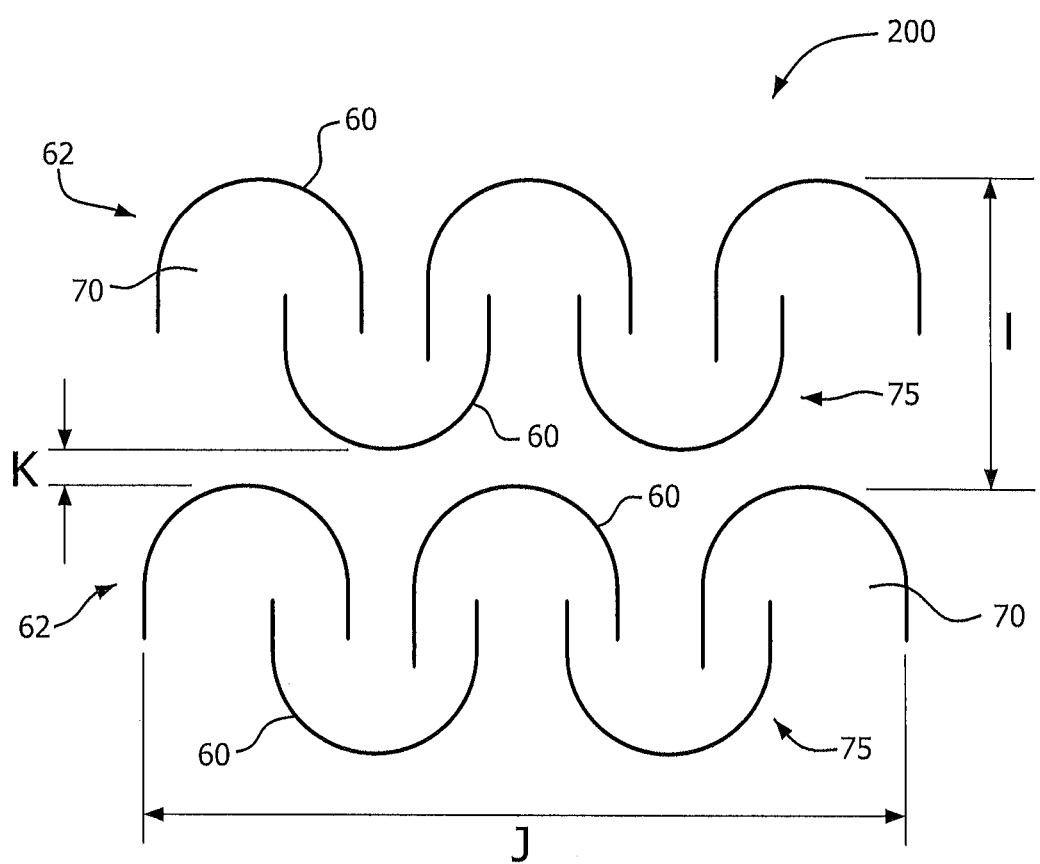
FIG. 6 is a schematic illustration of a block pattern containing at least three inverted incised flaps overlapping non-inverted flaps that may be utilized to form an incised panel according to one exemplary embodiment of the invention.

FIG. 6 depicts an exemplary block pattern that may be utilized to form an incised panel. A block pattern may be formed of two or more rows. A block pattern 200 having two rows is shown in FIG. 6. Each row contains three inverted incised flaps 62 overlapped with two non-inverted incised flaps 75. Each row of incised flaps 60 has a length "J", which ranges from about 1.5 mm to about 24 cm, from about 1.13 mm to about 18 cm, or from about 0.75 mm to about 12 cm. The distance between the rows is represented by "K", and is from about 0 to about 8 cm (up to about 8 cm), from about 0 mm to about 6 cm (up to about 6 cm), or from about 0 mm to about 4 cm (up to about 4 cm). For example, in an alternating pattern of curves (e.g., block pattern 200), such as depicted in FIG. 6, a "K" value of zero results in a pattern where the incised flaps do not overlap. It is to be appreciated that any number of incised flaps 60 (inverted and non-inverted) can be used to form the block pattern 200 and that the block pattern 200 illustrated in FIG. 6 is exemplary in nature.

TABLE 1

|   | Range 1 | Range 2 | Range 3 |
|---|---|---|---|
| A | 0.5 mm-8 cm | 0.38 mm-6 cm | 0.25 mm-4 cm |
| B | 0.5 mm-8 cm | 0.38 mm-6 cm | 0.25 mm-4 cm |
| B' | 0-8 cm | 0-6 cm | 0-4 cm |
| C | 0.1 mm-4 cm | 0.08 mm-3 cm | 0.05 mm-2 cm |
| D | 1 mm-16 cm | .75 mm-12 cm | 0.5 mm-8 cm |
| E | 0-8 cm | 0-6 cm | 0-4 cm |
| F | 1 mm-16 cm | 0.75 mm-12 cm | 0.5 mm-8 cm |
| G | 0-8 cm | 0-6 cm | 0-4 cm |
| H | 0.1-4 cm | 0.08 mm-3 cm | 0.05 mm-2 cm |
| I | 1 mm-16 cm | 0.75 mm-12 cm | 0.5 mm-8 cm |
| J | 1.5 mm-24 cm | 1.13 mm-18 cm | 0.75 mm-12 cm |
| K | 0-8 cm | 0-6 cm | 0-4 cm |

When sufficient tension is applied to a composite material containing one or more fundamental hinge systems 80, one or more of the fundamental flap cells 90, or one or more of the block pattern 200, the hinged flap portions move to an open configuration. The tension may be applied in any direction. In such an open configuration, the hinged flap portions are in a non-linear, three dimensional orientation with respect to the composite material. The non-linear orientation of the open hinged flap portions permits for a random scattering of visible, thermal, nIR, SWIR, and microwave/millimeter (RF) bands of the electromagnetic spectrum. In addition, selective transmission of these electromagnetic waves can be modulated by the geometry of the incised flap and the amount of tension applied to the incised panel. It is to be appreciated that a composite material having therein incised flaps as depicted in any of FIGS. 4, 5, and 6 can be used to form an incised panel.

Figure 7:
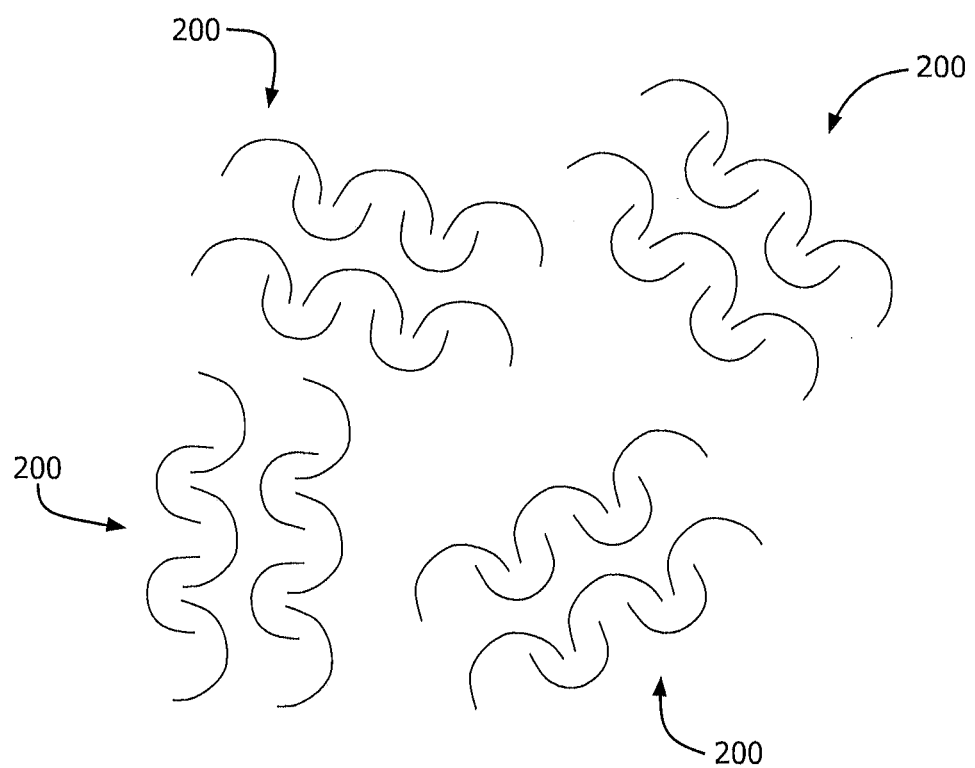
FIG. 7 is a schematic illustration of a random orientation of the block pattern depicted in FIG. 6.
Figure 8:
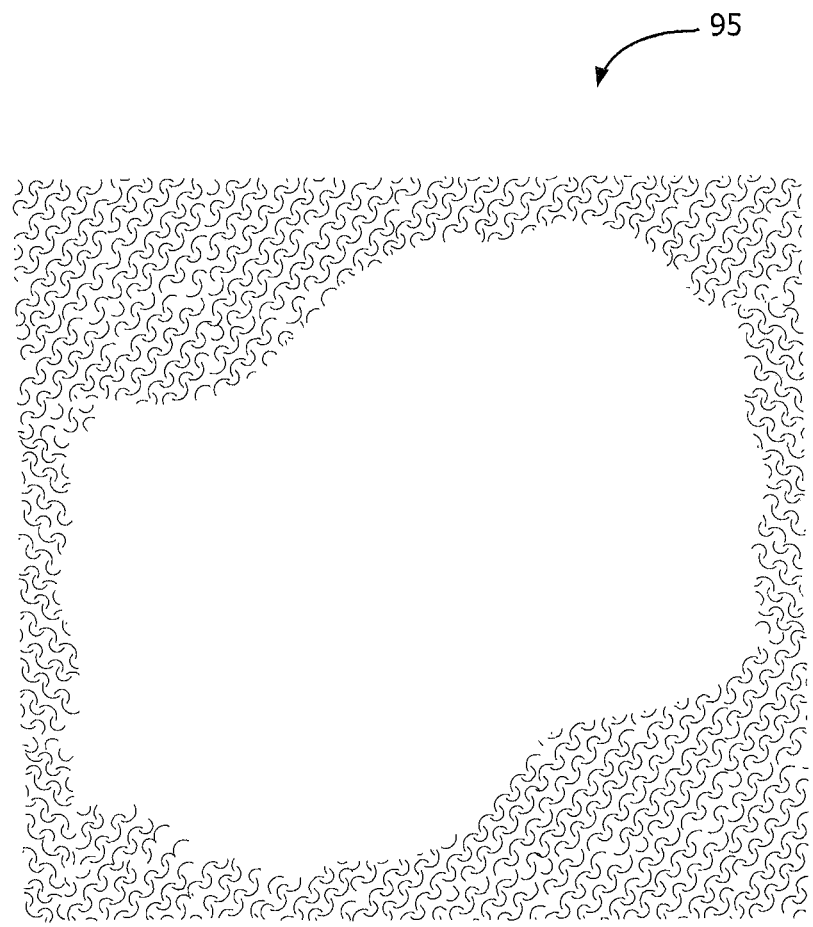
FIG. 8 is a schematic illustration of an incised panel according to one embodiment of the invention.
Figure 12:
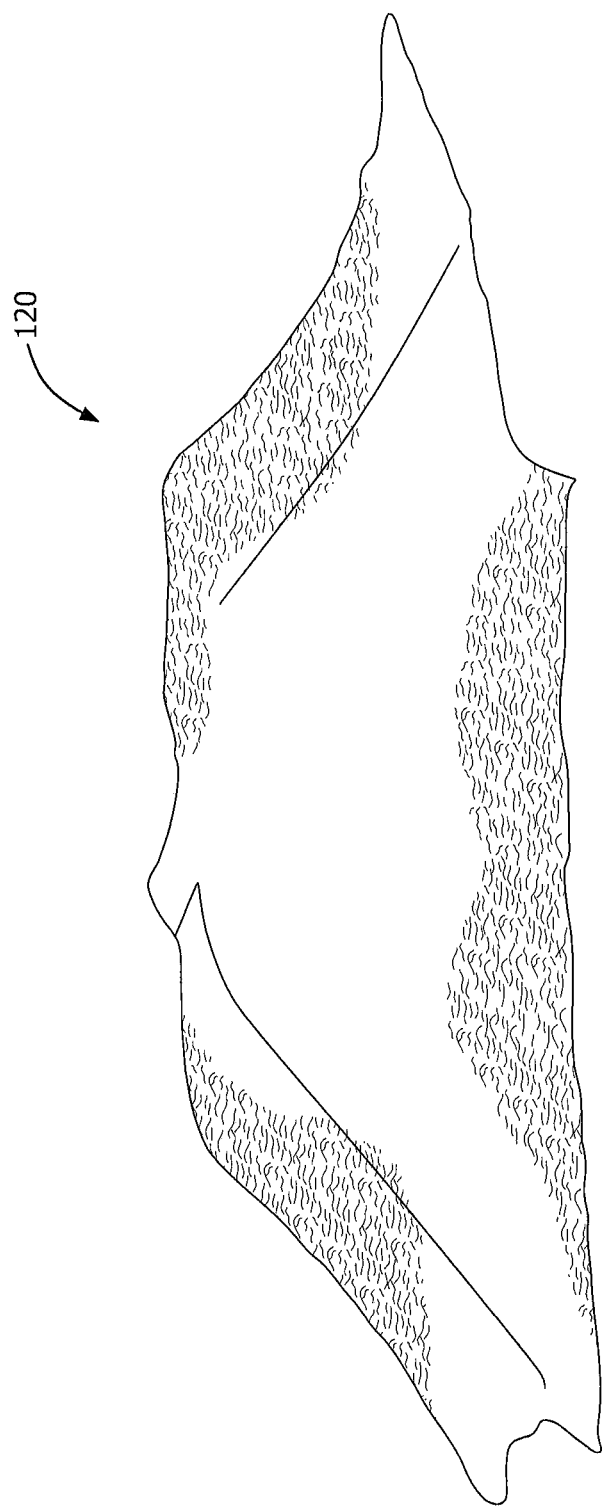
FIG. 12 is a schematic illustration of a cover formed from incised panels according to at least one exemplary embodiment of the invention.
Figure 13:
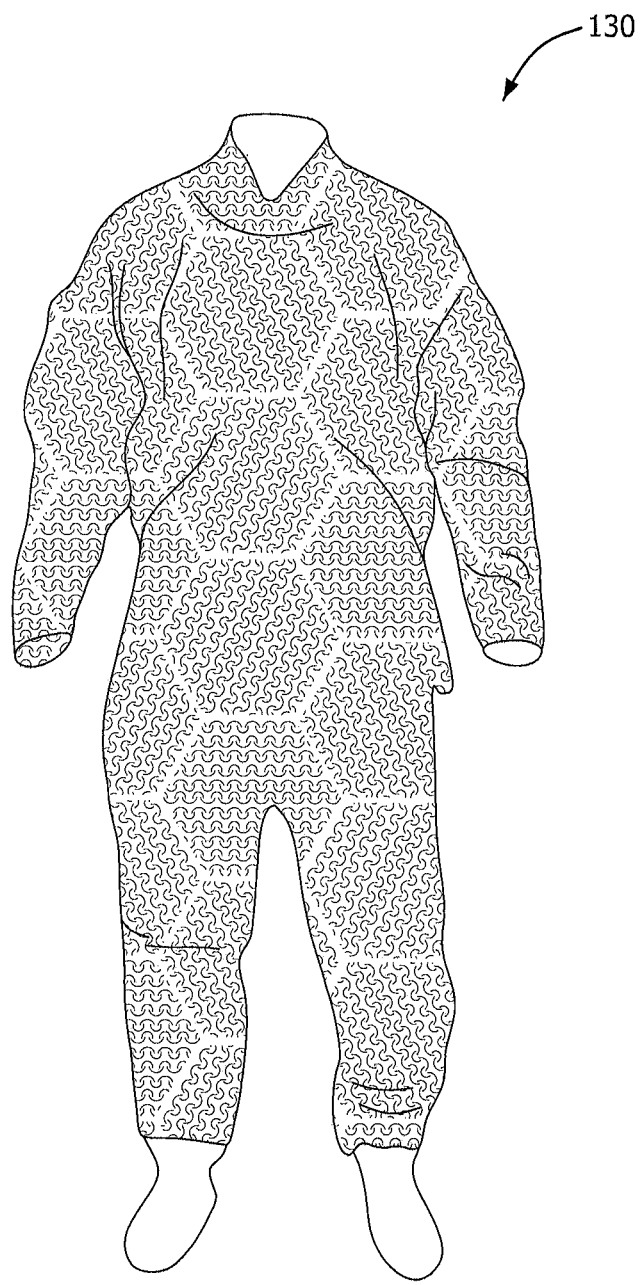
FIG. 13 is a schematic illustration of a dry suit formed from incised panels according to an exemplary embodiment of the invention.

A composite material can be incised with block patterns such that the hinged flaps are oriented so as to ensure forming a repeatable pattern that can be identified visually, thermally, or electromagnetically. As one example, block patterns may incised into the composite material in a repeated pattern such that the repeated pattern does not create a visually, thermally, or electromagnetically recognizable pattern. In some embodiments, block patterns are randomly positioned so as not form a repetitive pattern. It is to be appreciated that block patterns (or other pattern of incised hinges) do not form a radial pattern or ninety degree angle with respect to each other. FIG. 7 depicts a random orientation of the block patterns 200 that may be used to form an incised panel. An exemplary incised panel 95 formed of a random pattern of incised block patterns is illustrated in FIG. 8. It is to be appreciated that any number of patterns can be formed with the fundamental hinge system 80, the fundamental flap cell 90, or the block pattern 200 and used to form an incised panel, all of which are considered to be within the purview of the invention. In addition, the incised panel may be incised over all or only a portion of the panel. Incised panels may be used to form selective, multispectral reflective articles, such as a cover 120 (illustrated in FIG. 12) or garments (such as a dry suit 130 illustrated in FIG. 13).

In forming a cover according to one embodiment of the invention, an incised panel is attached to a base material. Any suitable process may be used to attach the incised panel to the base material, such as, but not limited to stitching, sewing, gluing, bonding, welding, heat sealing lamination, spray adhesive bonding, and the like. The base material may be, but is not limited to, mesh materials, woven textiles, non-woven textiles, textile laminates, and the like. Additionally, the cover may have any geometric shape. However, the covers may have a generally rectangular or square shape for ease of manufacturing.

The incised panel may be attached to the base material along all sides of the cover. For example, the incised panel and base material may be substantially square or substantially rectangular in shape and are stitched or sewn across the edges of each of the four sides of the cover. In addition, on or more incised panels may be utilized to form the cover. The incised panels may be stitched or otherwise attached together in a manner known to one of skill in the art. The application of tension to the cover, such as, for example, by pulling on two opposing sides, causes the incised flaps within the incised panel to open. Some or all of the incised flaps at least partially open with the application of tension. In at least one embodiment, the incised panel is sized smaller than the base material. By undersizing the incised panel, tension generated as the incised panel (e.g., cover) is pitched will cause the flaps to automatically open with a desired number of openings without further intervention by the operator. The incised panel may be at least about 2%, at least about 5%, at least about 10%, at least about 15%, or at least about 20% smaller than the size of the base material. In exemplary embodiments, the incised panel is from about 5% to about 20%, from about 5% to about 15%, or from 5% to about 10% smaller than the base material.

Figure 17:
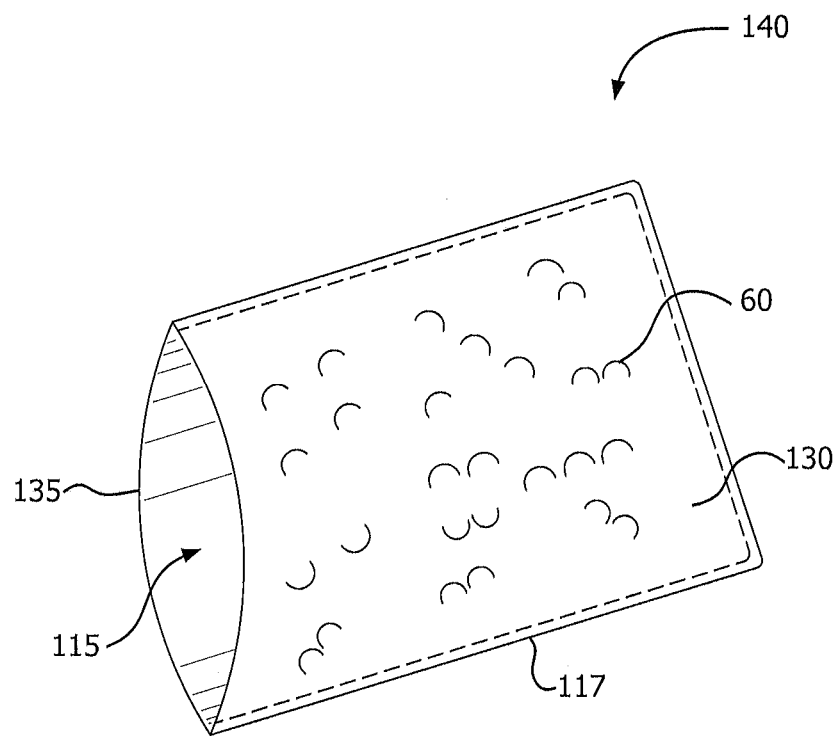
FIG. 17 is a schematic illustration of a reversible cover according to at least one exemplary embodiment of the invention.

In another embodiment, the incised panel 130 and base material 135 are joined at all edges except one edge to form a reversible cover. As depicted in FIG. 17, three of the four sides of the cover 140 may be stitched together at seams 117, leaving an opening 115 in one side of the cover 140. As with the embodiment described above, the application of tension to the cover 140 causes at least a portion of the incised flaps 60 to open or partially open. The opening 115 in the cover 140 permits an individual to reverse the cover 140 so that the base material 135 is positioned on the outside (e.g., toward the environment) and an opposing side of the incised panel 130 is visible.

Figure 18:
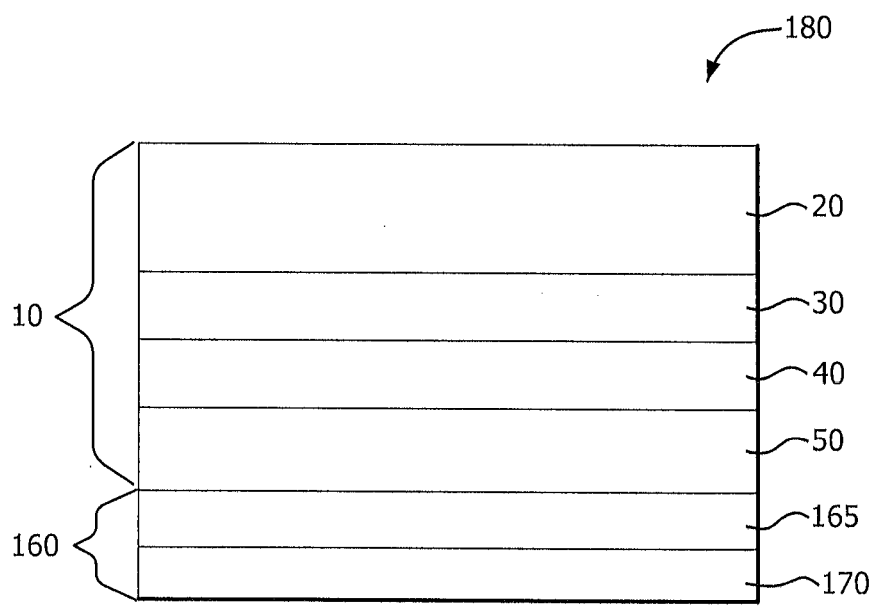
FIG. 18 is a schematic illustration of a reversible composite material according to at least one exemplary embodiment of the invention.

In forming a reversible cover, a composite material, such as composite material 10 (depicted in FIG. 1), may be formed and joined to a laminate 160 comprising an asymmetric ePTFE laminate 170 and a metal layer 165. The reversible composite material 180 thus formed is depicted in FIG. 18. In the reversible composite material 180, two external ePTFE membrane layers are present. Each external ePTFE membrane may be appropriately colored and/or designed so as to have a color(s) and/or pattern thereon (e.g., a camouflage pattern). In one embodiment, one side of the reversible composite material 180 depicts a woodland pattern and an opposing (second) side depicts a desert pattern. In addition, the external ePTFE membrane layers may have thereon coatings or other surface treatments, which may or may not be the same on each of the external ePTFE membrane layers. When the reversible composite material 180 is utilized to form the incised panel forming the cover, the cover is reversible.

In forming a garment according to another embodiment of the invention, incised panels are appropriately sized and cut to a shape such that the shaped panel pieces can be stitched together to form the desired garment. A seam allowance of one quarter of an inch may be incorporated into the cut, shaped panels so that there is a non-incised edge to allow the panels to be stitched together. In an embodiment where the garment is a maritime suit, the shaped panels are simultaneously sewn together and to an underlying dry suit (or wet suit). The seams may be rendered waterproof, such as by superimposing a waterproof sealant (e.g., a waterproof adhesive) or by applying a waterproof tape (e.g., GORE-SEAM® tape (available from W. L. Gore and Associates, Inc.)) through a bonding or welding process. Wearing the garment applies tension to the incised panels, causing the incised flaps therein to at least partially open.

Incised panels according to the instant invention provide degrees of freedom to control reflection, transmission, absorption, and apparent emissivity of the incised panel. In addition to the material properties of components forming the composite material, which control electromagnetic response, the incised flaps 60 add another level of control of electromagnetic spectral response. The size of the flap portion 70 and/or the incised flaps 60, the spacing between the incised flaps 60, and the opening and electrical properties of the incised flaps 60 can cause the energy of the incident wave to be redistributed upon reflection. Changing the shape or height of the hinged flap portion of the incised flaps 60 and the positioning of the incisions within the composite material can also modulate a wave's transmission from either side of the incised panel.

Manipulation of the incised flaps 60 and positioning of the incisions within the composite material can modulate a wave's transmission from either side of the incised panel. The incised flaps 60 have a range of "openness" varying from being completely open, to being partially open, or being fully closed. Within this application, an incised flap 60 having an opening of zero degrees is considered to be "closed" and an opening of greater than zero degrees is considered to be "open". Depending on the hinge system design utilized (e.g., the fundamental hinge system 80, the fundamental flap cell 90, or the block pattern 200) and/or number of incised flaps 60 in the composite material, little or no tension may be needed to keep the incised flaps 60 closed so that the panel's surface is smooth or substantially smooth. As used herein, "substantially smooth" is meant to describe a smooth surface or a nearly smooth surface. Increasing the tension applied to the incised panel will deflect or open the incised flaps 60 and create a rough (uneven/non-smooth/non-linear) surface on the panel. It is to be understood that the incised flaps 60 open at varying degrees upon tensioning the incised panel. In other words, some of the incised flaps 60 may open more or may open less than other incised flaps 60 within the incised panel. In addition, if the incised flap 60 has a shorter hinged flap portion 70, the distance "C" depicted in FIG. 3 (i.e., incision hole size) within the composite material will increase with increased tension.

Figure 11:
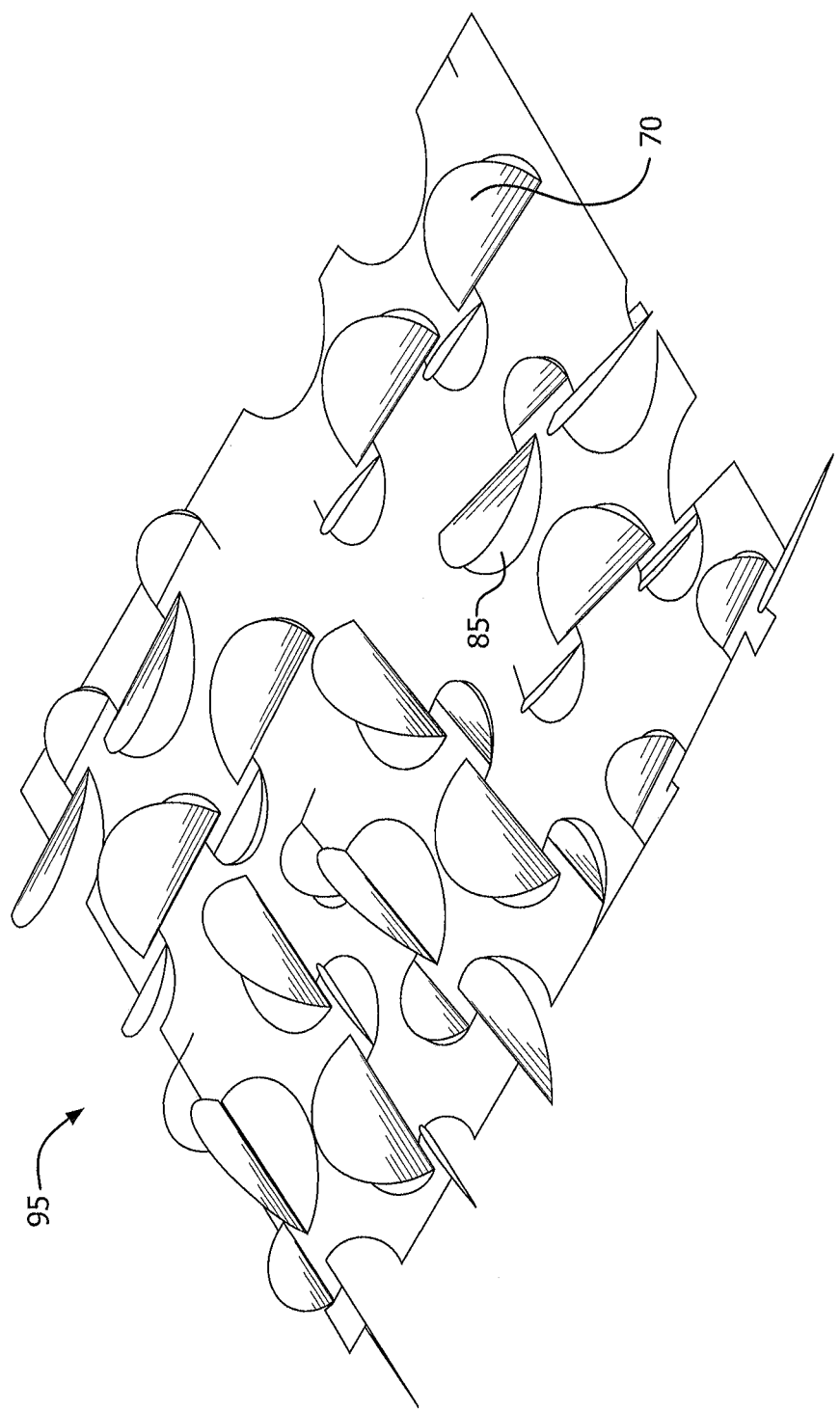
FIG. 11 is a schematic illustration of an incised panel having open hinged flaps according to one exemplary embodiment of the invention.

For example, if no or little tension is applied to the incised panel, the incised flaps 60 will remain relatively flat and closed. As a result, incident waves see a smooth or substantially smooth reflecting surface which will tend to reflect incoming waves in a particular direction (specular reflection). As tension to the incised panel is increased, the incised flaps 60 open at angles where the incident waves are directed and spread across or reflect in multiple directions. If the incised flaps 60 are cut or shaped to reveal more of an opening or hole, increased transmission is be possible as well as reflected or scattered energy. If limited transmission is desired while the incised flaps 60 are fully open, holes smaller than the wavelength can be implemented. As a result, spectral band responses can be designed and spatial responses reflected, and in some cases, diffusive transmission, may be obtained with an incised panel containing incised flaps 60 positioned in a random or patterned orientation such as described herein. A portion of an exemplary incised panel 95 having incised flaps 60 and open hinged flap portions 70 is depicted in FIG. 11. When the hinged flap portions 70 of the incised flaps 60 are in an open configuration, opening 85 in the incised panel 95 is formed. As discussed herein, the openings 85 form transmissive regions within the composite material (and in the incised panel 95). It is to be appreciated that incised panels 95 may have incised flaps 60 covering the entire surface or only a portion(s) thereof.

In the case of thermal imaging, the incised flaps 60 and the opening 85 of the incised flaps 60 can change observed responses due to the flaps emissivity property, orientation to incoming radiation, and the amount of radiation coming through the incised hole. Radiosity is the term used for the compilation of reflective, self emissive and transmissive responses that are detected by a sensor. By incising a panel that has emissive properties, radiosity can be controlled. For instance, by tensioning the incised panel 95 so that the incised flaps 60 are opened at a desired angle, a hot radiant body's emissive radiation transmits through the openings in the incised panel. The radiosity changes due to the additional transmissive component behind the panel. In addition, incoming wave energy from the environment is reflected diffusely when the open, incised flaps 60 provide a "rough" (non-smooth) surface. The hot radiant body's transmission is diffused because the wave energy makes contact with the open, incised flaps 60 as it passes through the incised panel, which, in turn, increases the chance that the radiant energy will be deflected in other directions. RF energies respond to the same mechanisms.

Another way of changing the radiosity of a panel from a sensor's point of view is to incorporate different emissivity properties to the back side of an incised material (e.g., provide an emissivity different than front of panel). Depending on the amount of tension applied, the incised flaps 60 will open to reveal the back of the flap portion 70. If the back side of the flap portion 70 contains a different emissivity than the front of the incised flaps 60, a different front panel thermal property and net radiosity may be obtained.

Another advantage of opening an incised flap 60 within an incised panel is that it can act as a cooling fin, Open flaps create a surface area where any fluid (air or water) passing over them will efficiently draw heat from the flaps base. By Planck's equation, a drop in temperature will drop the emissive power. By controlling the tension of the incised panel and its impact on the incised flap 60 opening (along with flap density and emissive properties), apparent temperatures seen by a sensor can be modulated.

For multispectral laminates, such as from visible to thermal wavelengths (MWIR and LWIR), many performance attributes are needed for proper field performance. In addition, visible light incident on the top surface should diffuse the energy spatially. Otherwise, high gloss could occur, letting the laminate be "seen" by a sensor.

Spectral wise, the general requirements from visible to RF are,
  visible (0.4-0.7 µm): High reflection, low transmission
  nIR (0.7-0.9 µm): High reflection, low transmission
  SWIR (0.9-2.5 µm): High reflection, low transmission
  Thermal: High Transmission, Low reflection
  RF: Low reflection
  Spatial wise, the general requirements are:
  visible: highly diffusive (non-specular)
  RF: diffusive scattering It has been discovered that membranes with inherent different structural strata such as two-layer and three-layer ePTFE asymmetric laminates including an "open" membrane and a "tight" ePTFE membrane may be used to meet the reflection and special requirements identified above. It has been determined that an outer, open ePTFE layer (e.g., ePTFE membrane 25) in an ePTFE asymmetric laminate provides spatial diffusion to lower gloss in the composite material. A "tight" ePTFE layer (e.g., ePTFE membrane 35) in the ePTFE asymmetric laminate reinforces reflections in the shorter wavelength bands and satisfies the overall reflection requirements, without adding mass to the entire membrane package, which, in turn, could affect the thermal wavelengths. In the three-layer asymmetric ePTFE laminate 150, the inner "open" ePTFE membrane 85 adds to reinforce scattering and acts as a buffer to the adhesive that laminates the membrane layers together within the composite material. Without the buffer (e.g. a "tight" ePTFE layer laminated directly to next layer in the laminate (such as the metalized layer 30)), the adhesive may push into the "tight" ePTFE layer in the asymmetric ePTFE laminate, thereby undesirably compressing the membrane and reducing reflection performance.

Having generally described this invention, a further understanding can be obtained by reference to certain specific examples illustrated below which are provided for purposes of illustration only and are not intended to be all inclusive or limiting unless otherwise specified.

TEST METHODS

It should be understood that although certain methods and equipment are described below, any method or equipment determined suitable by one of ordinary skill in the art may be alternatively utilized.

RF Test Method

RF testing was conducted in an electromagnetic anechoic chamber. A metal target was placed at one end of the chamber, while a set of two pyramidal antennas (ATM, Patchogue, N.Y.) were set-up on the other side of the chamber on a monostatic configuration, pointed towards the target. One antenna was designated as the transmit antenna while the other as the receive antenna. Five pairs of antennas were used to cover the frequency range from 5-110 GHz. A 2-port vector network analyzer (Agilent AT-E8364C, Santa Clara, Calif.) was connected to the two antennas via coaxial test cables attached to each port. The vector network analyzer (VNA) covered the frequency range from 10 MHz-50 GHz. Additional Agilent millimeter modules were used to cover the frequency ranges 50-75 GHz and 75-110 GHz.

For each band of RF frequencies of interest, calibration was performed. After calibration, a frequency sweep was initiated in the RF band of interest, where the target's reflection response was measured and stored. A 4'×4' sample panel was placed 1.5 feet in front of the target. The panel was placed in tension to minimize folds and to maximize sample performance. A second frequency sweep was performed to measure and store sample/target reflection response data. The sample was rotated three times to acquire 3 more reflection data sets. The sample data sets were averaged and normalized with respect to the target's reflection data. With the target's reflection calibrated as a 100% reflectance, the sample's spectral properties were compared to the amount of reflection reduction compared to 100% reflection with just the target alone.

Reflectance Test Method for Visible to SWIR Infrared Spectra

The spectral near normal-hemispherical reflectance of the samples (for example, the colored side of the first substrate of a construct) in the visible and near infrared (nIR) spectral range was measured using UV/VIS/nIR spectrophotometer (Jasco V670, Easton, Md.) fitted with a 150 mm diameter, integrating sphere coated with Barium Sulfate that collects both specular and diffuse radiation. The reflectance measurements are made with double beam mode of operation and Spectralon® materials were used as references from 250 nm to 2500 nm at 20 nm intervals.

The samples were measured as a single layer with a backer. The backers used were dull black coated polymer sheets. Measurements were taken on a minimum of three different areas and the data of the measured areas was averaged. In this work, all the measurements were performed for near normal incidence, i.e. the sample was viewed at an angle no greater than 10 degrees from the normal, with the specular component included. The Photometric accuracy of the spectrophotometer was calibrated to within 1 percent and wavelength accuracy within 2 nm with a standard aperture size used in the measurement device. To compensate for the signal loss due to the backer material, the sample reflectance was calculated according to ASTM E903-96 standard test method for Reflectance of materials using integrating sphere.

Test Method for Hemispherical Reflectance and Transmittance Over the Thermal Infrared Spectral Range Spectral near normal-hemispherical transmittance and reflectance in the thermal infrared spectrum is of great importance for the design and evaluation of this invention. The measured hemispherical reflectance and transmittance spectra can be used to compute directional emissivity via Kirchhoff's law ($\epsilon=1-R-T$; for opaque substrates, $\epsilon=1-R$ [where $\epsilon$ is emittance, R is reflectance, & T is transmittance).

To measure the direction-hemispherical transmittance and reflection, the samples were viewed at an angle no greater than 10 degrees from the normal, with the specular component included. Measurements were made of the spectral hemispherical transmittance and reflectance of the samples over the range 600 $cm^{-1}$ to 5000 $cm^{-1}$, with a spectral resolution of 8 $cm^{-1}$. The optical radiation source and wave number selectivity were provided by a Nicolet 6700 Fourier-Transform Infrared (FTIR) spectrophotometer (ThermoScientific, Waltham, Mass.), which was configured with a ceramic-coated globar source and a Ge-coated KBr beam splitter. The hemispherical measurement geometry is implemented by using a diffuse-gold coated 150 mm diameter integrating sphere (Mid-IR IntegratIR-Pike Technologies), with the samples mounted on a port cut into the surface of the sphere. A liquid-nitrogen-cooled MCT detector is mounted on top of the sphere with its field of view restricted to a portion of the bottom surface of the sphere. The Mid-IR Integral IR features an 8 degree illumination of the sample and reflectance samples are placed directly onto the sample port of the upward-looking sphere or over a thin infrared transmitting window.

For reflectance measurement, square sections of samples approximately 40 $mm^2$ were cut and mounted onto an 18 mm horizontal reflectance sampling port on the integrating sphere. A diffuse gold reference standard was used in the measurement and all the samples were placed on a backer material made of dull black paint coated polymer. The spectrum of each sample was collected with a rapid scan mode and 200 scans per sample. Three readings were taken for each sample and the resulting data averaged. To compensate for the signal loss due to the backer material, the sample reflectance was calculated according to ASTM: E903-96 standard test method for Reflectance of materials using integrating sphere.

Transmittance of transparent or translucent materials in the region from 2 μm to 17 μm was measured by placing the sample at the transmission station accommodating a standard 2"×3" sample holder. The instrument was then set in the absolute measurement (100%) position, and the 100% signal without the sample in the measurement position is recorded. The sample was then placed into position and the transmitted reading is recorded. The transmitted signal divided by the 100% signal equals the transmittance.

ASD Spectral Measurement

An ASD FieldSpec 3 Spectroradiometer (ASD, Boulder, Colo.) was used to collect spectral reflectance data. The spectroradiometer was turned on and allowed to warm up for 45 Minutes. Next, the spectroradiometer was set to average 128 measurements per scan.

Figure 10:
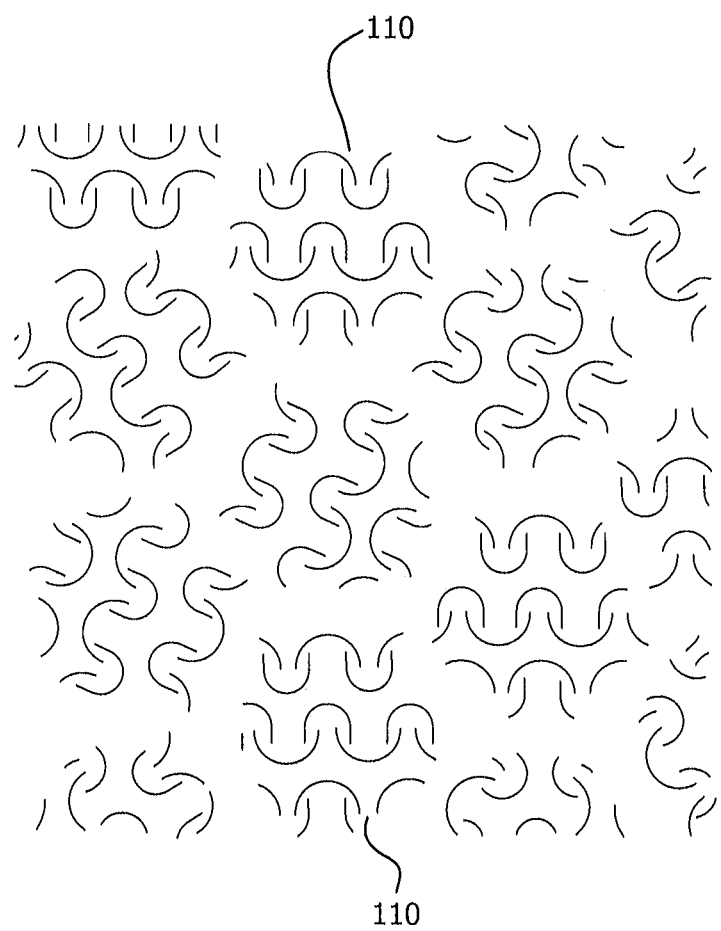
FIG. 10 is a schematic illustration of a partial incised panel formed from the hexagonal blocks of FIG. 9.

Two Macbeth Spectra light III Luminaires, 122 cm square sample holder were positioned generally as shown in FIG. 10. The luminaries were allowed to warm up for 15 minutes.

Next, a 61 cm square White Spectralon reference standard was placed in the center of the sample holder. A 10 degree field of view fore optic was attached to the Fieldspec hand grip and the handgrip was mounted to a tripod and positioned so that the front of the foreoptic was centered on the spectralon reference panel at a height of approximately 120 cm and a distance of approximately 2.6 meters from the reference panel.

The evenness of illumination was verified to be within +−10% over the surface of the reference panel using an INS DX-200 Illumination meter (INS Enterprise Co., Ltd., Taiwan, R.O.C.). Using a red laser pointer, the spot size of the radiometer was verified to be approximately 45 cm in diameter and centered on the reference panel. The room lights were then turned and a white reference scan was taken with the spectroradiometer.

The reference panel was then removed and replaced by a 120 cm square test specimen. The specimen was attached to the perimeter of the sample holder using a multitude of large binder clips.

The room lights were again turned off and a scan was taken of the test specimen. The specimen was then removed and rotated 90 degrees and another scan was initiated. This removal/rotate scan process was repeated two more times so that the specimen was tested thorough one full revolution. The scans collected were imported into Microsoft® Excel and the white reference data calibrated to represent 100% reflectance. The test specimen scans were then averaged and compared to the white reference and percent reflectance was calculated for each specimen.

EXAMPLES

Example 1

A cover panel formed of a composite material was made in the following manner. A woven polyester fabric (Style No. 751125 from Milliken & Co., Spartanburg, S.C.) was obtained. An expanded PTFE membrane having the following properties was obtained: density=0.7 g/cc; thickness=0.028 mm; matrix tensile strength in one direction=100 MPa; matrix tensile strength in the orthogonal direction=161 MPa; bubble point=24 psi. The polyester fabric and the ePTFE membrane were laminated with a polyurethane adhesive using conventional gravure lamination techniques, thereby creating a laminated material.

The ePTFE side of the laminated material was subsequently metalized with aluminum using a physical vapor deposition technique to achieve an optical density of 4.7. Next, a transfer foil DT800, Dunmore Corp., Bristol, Pa.) was obtained and a disruptive thermal camouflage (TC) pattern was applied to the non-carrier side of the transfer foil in order to provide a disruptive thermal pattern. The pattern was applied through the use of a stencil to create a camouflage pattern. A grey primer (Colorplace Gray spray Primer, Style #263453) was spray painted onto the metalized side. A second ePTFE membrane having an open-tight-open structure was obtained having the following properties: density=0.42 g/cc; thickness=0.069 mm; matrix tensile strength in one direction=44 MPa; matrix tensile strength in the orthogonal direction=118 MPa; bubble point=24 psi. The metalized side of the laminated material was then laminated to the second ePTFE membrane with a polyurethane adhesive using conventional gravure lamination techniques, thereby creating a composite material. The outer-facing ePTFE layer was subsequently colored in a woodland camouflage pattern with a pigmented ink using an ink jet printer.

The pigmented material was then laser cut to create repeating blocks of the pattern shown in FIG. 7 without creating adjacent blocks that were oriented in the same direction, as indicated in FIG. 8. The pigmented material was incised over its entire dimension. Nor were the adjacent blocks oriented perpendicular to each other.

An approximately 1.32 meter square mesh base (Style No. 965097 from Milliken & Co., Spartanburg, S.C.) was obtained. The laser cut pigmented material was sized to approximately 1.25 meter square. The pigmented material and a mesh material (Milliken & Co., Style 965097) were stitched around all four edges to form a cover. Under tension, a substantial number of hinged flaps were observed to open.

Testing was performed on an incised and a non-incised panel. Table 1 contains the directional-hemispherical transmittance and reflectance data of all data points collected and averaged over the spectral ranges Vis (0.4 μm-0.7 μm), nIR (0.7 μm-0.9 μm), SWIR (0.9 μm-2.5 μm), MWIR (3 μm-5 μm) and LWIR (9 μm-12 μm) for the non-incised panel.

The testing of the incised panel was performed under tension. The cover had the following properties, microwave reflection (5 GHz-110 GHz) of 15% below a metal plate standard (100%); visible light reflectance=11%; near IR reflectance=22%; SWIR reflectance=29%. Results of the tension testing are set forth in Table 2.

TABLE 1

| | Cover Panel (No Tension) | | | | |
|---|---|---|---|---|---|
| | Visible Average % Reflection | nIR Average % Reflection | SWIR Average % Reflection | MWIR Average % Reflection | LWIR Average % Reflection |
| Desert | 35 | 47 | 54 | 55 | 45 |

TABLE 2

| | Cover Panel (Under Tension) | | | |
|---|---|---|---|---|
| | Visible Average % Reflection | nIR Average % Reflection | SWIR Average % Reflection | Microwave Average % Reflection (5-110 GHz) |
| Woodland | 11 | 22 | 29 | 15 |

Example 2

A reversible cover panel formed of a two-sided composite material was made by combining the composite material of Example 1 and a second material made in the following manner. A transfer foil (DT800, Dunmore Corp., Bristol, Pa.) was obtained and a disruptive thermal pattern was applied to the non-carrier side of the transfer foil as described in Example 1. An ePTFE layer as described as the "second ePTFE" of Example 1 was obtained and laminated to the primed, non-carrier side of the transfer foil in the same manner described in Example 1. Next, the carrier of the transfer foil was removed. The foil side of this second material was laminated to the textile side of the composite material of Example 1 using conventional gravure lamination techniques such that the ePTFE layers were facing outwards.

One of the outer-facing ePTFE layer was subsequently colored in a woodland camouflage pattern and the other outer-facing ePTFE layer was colored in a desert camouflage pattern, both utilizing pigmented ink using an ink jet printer.

The pigmented material and a mesh material as described in Example 1 were stitched around three edges to form a cover. Testing of the non-incised cover is shown in Table 3. The testing of the incised cover was performed under tension. The woodland side of the two-sided composite material had the following properties. Microwave reflection of 10% below a metal plate standard; visible light reflectance=11%; near IR reflectance=22%; SWIR reflectance=29%. The desert side of the two-sided composite material had the following properties. Microwave reflection of 10% below a metal plate standard; visible light reflectance=27%; near IR reflectance=37%; SWIR reflectance=39%. Results of the testing for the incised cover panel (both Desert and Woodland sides) are set forth in Table 4.

TABLE 3

Cover Panel (Non-Incised)

| | Visible Average % Reflection | | nIR Average % Reflection | | SWIR Average % Reflection | | MWIR Average % Reflection | | LWIR Average % Reflection | |
|---|---|---|---|---|---|---|---|---|---|---|
| | No TC | TC | No TC | TC | No TC | TC | No TC | TC | No TC | TC |
| Desert | 35 | 35 | 47 | 46 | 54 | 40 | 55 | 30 | 45 | 10 |
| Woodland | 18 | 16 | 39 | 16 | 50 | 39 | 52 | 30 | 41 | 10 |

TABLE 4

Cover Panel (Incised)

| | Visible Average % Reflection | nIR Average % Reflection | SWIR Average % Reflection | Microwave Average % Reflection (5-110 GHz) |
|---|---|---|---|---|
| Desert | 27 | 37 | 39 | 10 |
| Woodland | 11 | 22 | 29 | 10 |

Example 3

Figure 9:
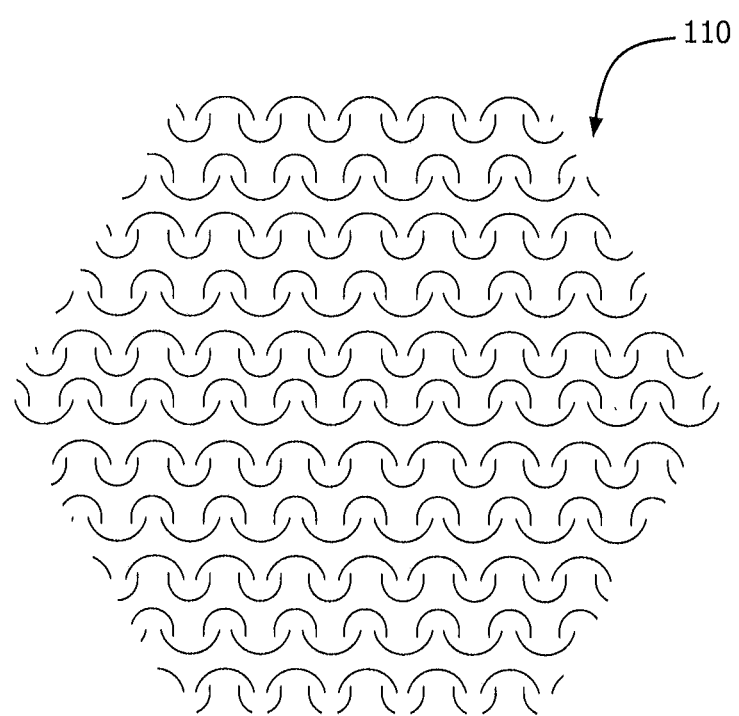
FIG. 9 is a schematic illustration of a hexagonal block of incised flaps having a repeating pattern according to one exemplary embodiment of the invention.

A maritime garment was made using the cover material of Example 2 with the following exceptions. The pigmented material was laser cut to create a pattern of repeating hexagonal blocks. One such hexagonal block 110 is illustrated in FIG. 9.

Each hexagonal block of pattern was rotated 60 degrees and placed adjacent to a subsequent hexagonal block pattern with a ⅛ inch gap therebetween. As a result, no adjacent blocks of pattern were oriented in the same direction. This was repeated to form the panel shown in FIG. 10.

Panels as generally shown in FIG. 10 were cut and sewn to create a maritime garment. A seam allowance of ¼ inch was incorporated into the cut panels so that there was an non-incised edge to allow for the panels to be stitched together. While the panels were being sewn together, the panels were simultaneously sewn to an underlying dry suit (Laminate Part No. WKAX143604E from W.L. Gore and Associates, Newark, Del.) that meets military specifications. The seams were subsequently seam sealed with seam tape (Part No. 6GSAM025DSVP from W.L. Gore and Associates, Newark, Del.) to form a maritime garment.

Non-incised panels forming the maritime laminate were measured on the benchtop spectrometers. Visible light reflectance=14%, near IR reflectance=29%; SWIR reflectance=31%, MWIR=36%, and LWIR=41%.

TABLE 5

Panel (Non-Incised)

| Visible Average % Reflection | nIR Average % Reflection | SWIR Average % Reflection |
|---|---|---|
| 14 | 40 | 60 |

TABLE 6

Panel Incised)

| Visible Average % Reflection | nIR Average % Reflection | SWIR Average % Reflection |
|---|---|---|
| 11 | 35 | 44 |

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

What is claimed is:

1. A cover comprising:
   a base material; and
   a garnish material affixed to said base material, said garnish material comprising a plurality of incised flaps, each said incised flap having a hinged flap portion,
   wherein at least a portion of said hinged flap portions assume a three dimensional, non-linear open configuration upon an application of tension to said garnish material,
      wherein said incised flaps in said garnish material are oriented as a plurality of discrete block patterns where each discrete block has at least two parallel rows of a fundamental hinge system, each row comprising one inverted incised flap and two non-inverted incised flaps,
   wherein said incised flaps have an overlapping region,
   wherein said discrete blocks have a width from 1.5 mm to 24 cm, and wherein said garnish material has a size that is at least about 2% smaller than a size of said base material.

2. The cover of claim 1, wherein said hinged flap portions randomly scatter RF energy.

3. The cover of claim 1, wherein said garnish material comprises at least three non-incised edges to permit said garnish material to be attached to said base material, and
wherein said base material is affixed to said garnish material along said three non-incised edges to leave an opening along a fourth edge.

4. The cover of claim 3, wherein said cover is reversible.

5. The cover of claim 1, wherein said garnish material has a size that is from about 5% to about 20% smaller than a size of said base material.

6. The incised panel of claim 1, wherein said plurality of discrete block patterns are randomly oriented in said garnish material.

7. The incised panel of claim 1, wherein said plurality of discrete block patterns does not form a radial pattern in said garnish material.

8. The incised panel of claim 1, wherein one of said plurality of discrete block patterns does not form a ninety degree angle with another of said plurality of block patterns in said garnish material.

9. The cover of claim 1, wherein said hinged flap portion has a first height that is less than a second height of said incised flaps.

10. The cover of claim 1, wherein said incised flaps form a hexagonal block having a repeating pattern.

11. A cover comprising:
a base material; and
a garnish material affixed to said base material, said garnish material having a plurality of semi-circular interlocking incised flaps having an overlapping region, said overlapping region having a height from 0.5 mm to 8 cm and a width from 0.5 mm to 8 cm,
wherein each said incised flap comprises a hinged flap portion,
wherein said incised flaps in said garnish material are oriented as a plurality of discrete block patterns where each discrete block has at least two parallel rows of a fundamental hinge system, each row comprising one inverted incised flap and two non-inverted incised flaps,
wherein said fundamental hinge system has a height from about 1 mm to about 16 cm and a width from about 1 mm to about 16 cm,
wherein said discrete blocks have a width from 1.5 mm to 24 cm, and
wherein said garnish material has a size that is at least 2% smaller than a size of said base material.

12. The cover of claim 11, wherein said garnish material has a size that is from about 5% to about 20% smaller than a size of said base material.

13. The cover of claim 12, wherein
at least a portion of said hinged flap portions have a three dimensional, non-linear configuration with respect to said garnish material.

14. The cover of claim 13, wherein said hinged flap portions randomly scatter RF energy.

15. The cover of claim 13, wherein said hinged flap portions have a first height that is less than a second height of said incised flaps.

16. The cover of claim 11, wherein said garnish material comprises at least three non-incised edges to permit said garnish material to be attached to said base material,
wherein said base material is affixed to said garnish material along said three non-incised edges to leave an opening along a fourth edge, and
wherein said cover is reversible.

17. The cover of claim 11, wherein said incised flaps have an overlapping region, said overlapping region having a height from about 0.5 mm to about 8 cm and a width from about 0.1 mm to about 4 cm.

18. The incised panel of claim 11, wherein said plurality of discrete block patterns are randomly oriented in said garnish material.

19. The incised panel of claim 11, wherein said plurality of discrete block patterns do not form a radial pattern in said garnish material.

20. The incised panel of claim 11, wherein one of said plurality of discrete block patterns does not form a ninety degree angle with another of said plurality of block patterns in said garnish material.

21. A garment comprising:
a plurality of incised panels, each said incised panel comprising
a base material and a garnish material affixed to said base material, said garnish material comprising incised flaps having a width from 0.5 mm to 8 cm and a height from 0.5 mm to 8 cm,
wherein each said incised flap comprises a hinged flap portion,
wherein said hinged flap portions have a non-linear, three dimensional configuration with respect to said incised panels,
wherein said incised flaps in said garnish material are oriented as a plurality of discrete block patterns where each discrete block has at least two parallel rows of a fundamental hinge system, each row comprising one inverted incised flap and two non-inverted incised flaps,
wherein said incised flaps have an overlapping region, said overlapping region having a height from about 0.5 mm to about 8 cm and a width from about 0.1 mm to about 4 cm,
wherein said fundamental hinge system has a height from about 1 mm to about 16 cm and a width from about 1 mm to about 16 cm, and
wherein said discrete blocks have a width from 1.5 mm to 24 cm, and
wherein said garnish material has a size that is at least 2% smaller than a size of said base material.

22. The garment of claim 21, wherein said plurality of discrete block patterns are randomly oriented in said incised panel.

23. The garment of claim 21, wherein said plurality of discrete block patterns does not form a radial pattern in said garnish material.

24. The garment of claim 21, wherein one of said plurality of discrete block patterns does not form a ninety degree angle with another of said plurality of block patterns in said incised panel.

25. The garment of claim 21, wherein said hinged flap portions randomly scatter RF energy.

26. The garment of claim 21, wherein said discrete block patterns are in the form of a hexagonal block pattern.

* * * * *